United States Patent
Skjæveland

(10) Patent No.: US 11,072,912 B2
(45) Date of Patent: *Jul. 27, 2021

(54) PROTECTION ELEMENT FOR AN EARTH-WORKING IMPLEMENT

(71) Applicant: KVERNELAND GROUP OPERATIONS NORWAY AS, Kvernaland (NO)

(72) Inventor: Magne Skjæveland, Klepp St. (NO)

(73) Assignee: KVERNELAND GROUP OPERATIONS NORWAY AS, Kvernaland (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,811

(22) Filed: Apr. 3, 2019

(65) Prior Publication Data
US 2019/0226182 A1 Jul. 25, 2019

Related U.S. Application Data

(63) Continuation of application No. 15/108,009, filed as application No. PCT/NO2014/050233 on Dec. 11, 2014, now Pat. No. 10,287,752.

(30) Foreign Application Priority Data

Dec. 27, 2013 (NO) .................................. 20131742

(51) Int. Cl.
*E02F 9/28* (2006.01)
*A01B 15/06* (2006.01)
*A01B 23/02* (2006.01)

(52) U.S. Cl.
CPC ............ *E02F 9/2816* (2013.01); *A01B 15/06* (2013.01); *A01B 23/02* (2013.01); *E02F 9/2858* (2013.01)

(58) Field of Classification Search
CPC ..... E02F 9/2858; E02F 9/2883; E02F 9/2816; A01B 15/06; A01B 23/02
(Continued)

(56) References Cited

U.S. PATENT DOCUMENTS 2,888,758 A 6/1959 Allin, Sr.
2,987,838 A 6/1961 Stratton
(Continued)

FOREIGN PATENT DOCUMENTS

CN 1204376 A 1/1999
WO WO-2011/074983 A1 6/2011

OTHER PUBLICATIONS

Chinese Office Action and English translation, dated Nov. 15, 2017, 8 pages.
(Continued)

*Primary Examiner* — Thomas B Will
*Assistant Examiner* — Joel F. Mitchell
(74) *Attorney, Agent, or Firm* — Foley & Lardner LLP

(57) ABSTRACT

A protection element for an earth-working implement includes a flat plate having a wearing portion on a side of the flat plate facing a distal end of the earth-working implement. A lower portion of the flat plate forms an attachment portion provided with notches, projecting portions, or a combination thereof configured to engage with the earth-working implement. When the attachment portion is engaged with the earth-working implement, the protection element is configured to project above a plane coinciding with a top surface of at least a portion of the earth-working implement proximal to the protection element such that the portion of the earth-working implement proximal to the protection element is shielded from a flow of loose mass during use of the earth-working implement. The wearing portion is arranged (Continued)

at an upper portion of the flat plate. The attachment portion is arranged at a lower portion of the flat plate.

12 Claims, 2 Drawing Sheets

(58) Field of Classification Search
USPC .................................... 172/719, 772, 772.5
See application file for complete search history.

(56) References Cited

U.S. PATENT DOCUMENTS

| | | | |
|---|---|---|---|
| 3,020,655 A | 2/1962 | Launder | |
| 3,137,352 A | 6/1964 | Petersen | |
| 3,774,324 A | 11/1973 | Lafond | |
| 3,971,323 A * | 7/1976 | Beiswenger | E01B 27/12 |
| | | | 104/10 |
| 3,984,910 A * | 10/1976 | Helton et al. | B22F 7/08 |
| | | | 419/1 |
| 4,317,300 A | 3/1982 | Emrich et al. | |
| 4,404,760 A | 9/1983 | Hahn et al. | |
| 4,716,667 A | 1/1988 | Martin | |
| 5,067,262 A * | 11/1991 | Stiffler | E02F 9/285 |
| | | | 175/426 |
| 5,075,986 A | 12/1991 | Smith et al. | |
| 5,881,480 A * | 3/1999 | Fall | E02F 3/8152 |
| | | | 172/701.3 |
| 6,066,407 A | 5/2000 | Getz | |
| 6,216,368 B1 | 4/2001 | Bierwith | |
| 6,751,897 B2 | 6/2004 | Bierwith | |
| 6,854,527 B2 * | 2/2005 | Manway | E02F 3/8152 |
| | | | 172/701.1 |
| 6,952,892 B1 | 10/2005 | Bierwith | |
| 7,013,812 B2 * | 3/2006 | Williams | E01B 27/16 |
| | | | 104/10 |
| 7,320,505 B1 | 1/2008 | Hall et al. | |
| 7,665,234 B2 * | 2/2010 | Diehl | E02F 3/8157 |
| | | | 172/701.3 |
| 8,528,238 B2 | 9/2013 | Skjæveland | |
| 9,863,119 B2 * | 1/2018 | Congdon | E02F 9/2883 |
| 2003/0093928 A1 | 5/2003 | Bierwith | |
| 2004/0107608 A1 | 6/2004 | Meyers et al. | |
| 2008/0036278 A1 | 2/2008 | Hall et al. | |
| 2008/0216365 A1 | 9/2008 | Terveer | |
| 2009/0090524 A1 | 4/2009 | Carson et al. | |
| 2010/0205835 A1 | 8/2010 | Ruby | |
| 2012/0131820 A1 | 5/2012 | Brufau Guinovart et al. | |
| 2012/0145421 A1 * | 6/2012 | Smeets | A01B 15/06 |
| | | | 172/772.5 |
| 2012/0279096 A1 | 11/2012 | Skjæveland | |
| 2013/0091745 A1 | 4/2013 | Moller | |
| 2013/0340300 A1 | 12/2013 | Flores | |
| 2015/0041161 A1 * | 2/2015 | Smeets | A01B 15/06 |
| | | | 172/772.5 |
| 2015/0128460 A1 * | 5/2015 | Skjaeveland | E02F 9/2825 |
| | | | 37/455 |
| 2016/0227695 A1 | 8/2016 | Skjæveland | |
| 2016/0255757 A1 | 9/2016 | Skjæveland | |
| 2017/0130423 A1 * | 5/2017 | Congdon | E02F 9/2883 |

OTHER PUBLICATIONS

Norwegian Search Report, Application No. 20131742, dated Jun. 13, 2014, 2 pages.

* cited by examiner

PROTECTION ELEMENT FOR AN EARTH-WORKING IMPLEMENT

CROSS REFERENCE TO RELATED APPLICATIONS

The present application is a continuation of U.S. patent application Ser. No. 15/108,009, filed on Jun. 24, 2016, which is a National Stage of International Patent Application No. PCT/NO2014/050233, filed on Dec. 11, 2014, which claims the benefit of Norwegian Patent Application No. 20131742, filed on Dec. 27, 2013, the entire disclosures of all of these applications are incorporated herein by reference.

BACKGROUND

The invention relates to a protective element for a wearing-part attachment for a wearing part for a leading edge of a working member of an earth-working implement, the wearing part and the wearing-part attachment being provided with complementary quick-coupling elements, and a leading side surface of the protection element including a wearing portion. Further, the invention relates to a method of wear-protecting a wearing-part attachment for a wearing part for a leading edge of a working member of an earth-working implement, the wearing part and the wearing-part attachment being provided with complementary quick-coupling elements.

Earth-working implements, for example ploughs, harrows, excavator buckets and so on, are often provided with replaceable wearing parts in the form of wearing points, teeth and so on. To facilitate the replacement of such wearing parts, it is known to attach the wearing part to a wearing-part attachment by means of a quick-coupling. To have a desired effect of the quick-coupling system, it is obvious that the lifetime of the wearing-part attachment must be at least double the lifetime of the wearing part. In practice, it has turned out that extraordinary precautions must be taken at the wearing-part attachment to achieve the desired lifetime. The precautions may include applying a harder material, for example by hardfacing with a hard-metal coating or soldering with hard-metal elements, to the surface or surfaces of the wearing-part attachment that is/are subjected to the greatest wear, typically portions facing the material flow passing the wearing-part attachment.

Welding or soldering involves the necessity of supplying a relatively large amount of heat energy to the wearing-part attachment for the wearing-part attachment to achieve the desired temperature so that a sufficiently good adherence is provided between the hard metal and the wearing-part attachment. It is known in the art that a great difference in mass between the elements that are to be joined is disadvantageous. For example, if the wearing-part attachment has been hardened prior to the application of hard metal, the supply of heat may take the hardening out of an unduly large portion of the wearing-part attachment. A similar problem is associated with treating the wearing-part attachment with other materials, for example carbon to carbidize a portion of the wearing-part attachment, or nitrogen to nitrate a portion of the wearing-part attachment.

SUMMARY

An invention has been provided, in which a wearing-part attachment for a wearing part for a leading edge of an earth-working implement has been shielded by a separate protection element. The mass ratio of a wearing portion, with which a portion of the protection element is provided, to a supporting element of the protection element is favourable seen from a heat-economy point of view, as there is no supply of heat energy to the wearing-part attachment when the wearing portion is being attached.

The protection element is arranged upstream of a leading portion of the wearing-part attachment, as an attachment portion of the protection element is arranged to engage with quick-coupling elements on the wearing-part attachment or the wearing part, typically in the form of guiding portions formed as projecting ridges on the attachment portion of the wearing part and arranged to lockingly engage with complementary grooves in the wearing-part attachment. When the wearing part has been fixed to the wearing-part attachment, the protection element will be held in position between the wearing part and the wearing-part attachment and rest supportedly against a leading end face of the wearing-part attachment.

At least an upper portion of a leading side surface of the protection element is provided with a wearing portion, for example in the form of a hard metal, typically provided by a plate element, for example a carbide steel, having been attached to the leading side surface. It is conceivable for the wearing portion to be provided in a variety of ways. In its simplest form, a plate element from a carbide steel can be soldered or glued to the protection element, a ceramic plate element can be glued, a hard-metal coating can be vaporized, an upper portion of the protection element can be treated with a suitable gas, typically carbon for carbidizing or nitrogen for nitrating. Irrespective of the way chosen to achieve the desired effect, it is a relatively small element that is to go through a process for providing sufficient wear strength for the protection element that is to prevent wear on the relatively much larger wearing-part attachment.

In a first aspect, the invention relates more specifically to a protection element for a wearing-part attachment for a wearing part for a leading edge of a working member of an earth-working implement, the wearing part and the wearing-part attachment being provided with complementary quick-coupling elements, and a leading side surface of the protection element including a wearing portion, characterized by the protection element being arranged, by the engagement of an attachment portion with at least the quick-coupling elements of the wearing part, to be held in position between the wearing part and the wearing-part attachment and rest supportedly against a leading end face of the wearing-part attachment, projecting above a plane coinciding with a top surface of the wearing-part attachment, the attachment portion having a sectional profile complementary to the cross section of the quick-coupling element of the wearing part, and wherein the protection element is formed as a plate, in which the attachment portion is provided with notches and/or projecting portions complementary to the cross-sectional shape of the quick-coupling elements.

The wearing portion is arranged at a distance from the attachment portion.

The wearing portion may be taken from a group consisting of a plate element fixed to the plate by soldering or gluing, a coating applied to the plate in vapour form and an upper plate portion with a molecular structure in which a hardness-increasing substance has been added.

The plate element may be formed from carbide steel.

The plate element may be formed from ceramics.

In a second aspect, the invention relates more specifically to a method of wear-protecting a wearing-part attachment for a wearing part for a leading edge of a working member of an earth-working implement, the wearing part and the wearing-part attachment being provided with complementary quick-coupling elements, characterized by the method including the following steps:
  bringing an attachment portion of a protection element into engagement between quick-coupling sockets at a rear wearing-part portion of the wearing part, the attachment portion having a sectional profile complementary to the cross section of the quick-coupling element of the wearing part;
  connecting the wearing part and the wearing-part attachment to each other by engagement of said quick-coupling elements; and
  placing the protection element supportedly against a leading end face of the wearing-part attachment and so that it projects above a plane coinciding with a top surface of the wearing-part attachment.

BRIEF DESCRIPTION OF THE DRAWINGS

In what follows, an example of a preferred embodiment is described, which is visualized in the accompanying drawings, in which.

DETAILED DESCRIPTION OF VARIOUS EMBODIMENTS

Figure 1:
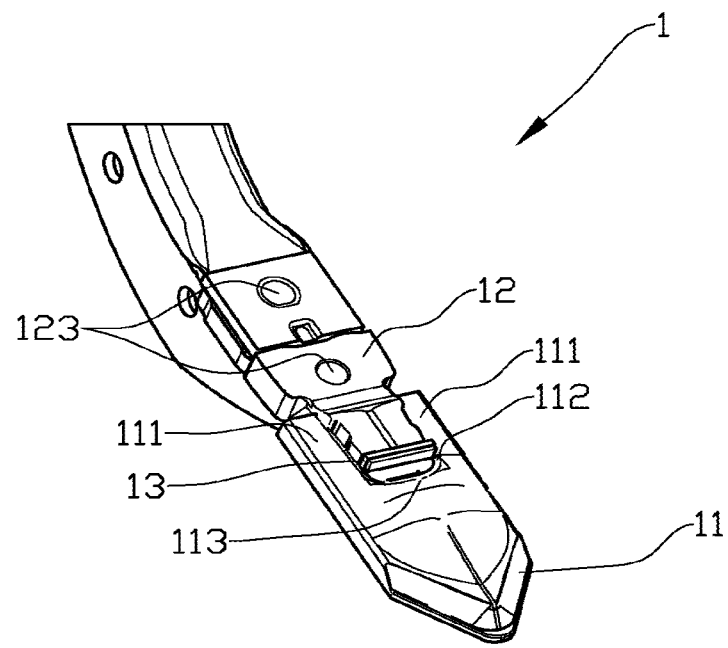
FIG. 1 shows, in perspective, a leading portion of a working member, shown here as a cultivator tine, in which a leading end face of a wearing-part attachment is shielded by a protection element according to the invention.
Figure 2:
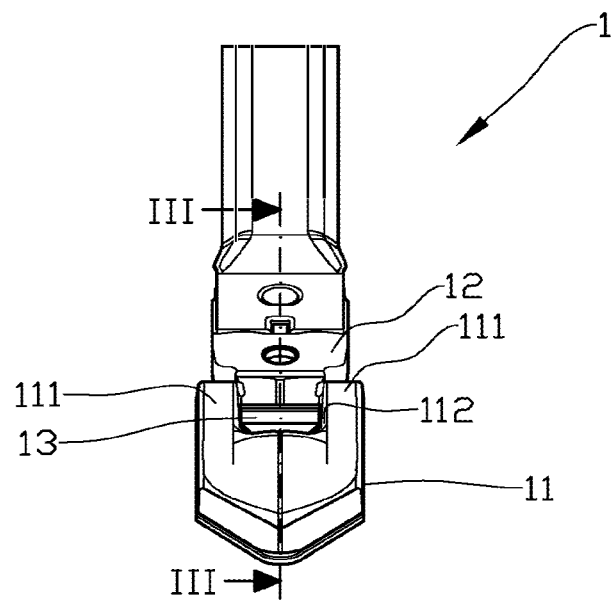
FIG. 2 shows a front view of the leading portion of the working member.
Figure 3:
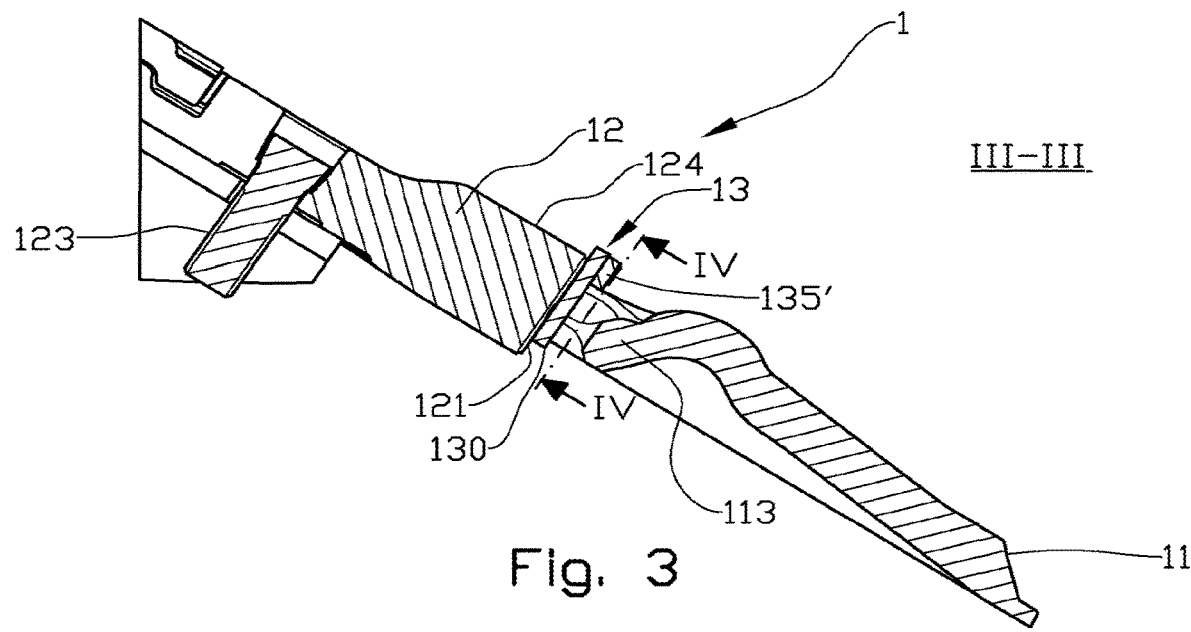
FIG. 3 shows, on a larger scale, a longitudinal section III-III according to FIG. 2 through the leading portion of the working member.

In the figures, the reference numeral 1 indicates a leading portion of a working member, illustrated here as a cultivator tine, provided with a wearing part 11 arranged on a leading edge of the working member 1. The wearing part 11 is provided with a quick-coupling holder 111 including quick-coupling elements 112 (see FIG. 4 in particular), shown here as ridges forming guide portions for engagement with complementary coupling grooves 122 arranged on a wearing-part attachment 12 which is fixed to the working member with several fixing bolts 123. The wearing-part attachment 12 has a leading end face 121 facing in the working direction of the working member 1 and facing a rear portion 113 of the wearing part 11.

A protection element 13 is arranged between the leading end face 121 of the wearing-part attachment 12 and the rear portion 113 of the wearing part 11. The protection element 13 is formed from a plate 130 forming a wearing portion 135 in an upper portion 133. In the figures, the wearing portion 135 is shown as a plate element 135' fixed to an upper portion 134 of a leading side surface 132 of the plate 130 in a suitable manner known to a person skilled in the art. If made from a metal, for example hard metal (carbide steel or the like), the plate element 135' may be fixed by means of soldering, or, if it is made from a non-metallic material, for example a ceramic material, be fixed by means of an adhesive. The protection element 13 extends higher up than a top surface 124 of the wearing-part attachment 12, so that the top surface 124 lies shielded behind the protection element 13.

In an embodiment not shown, an upper plate portion 133 is coated with a hard metal, for example by vaporing or welding, or treated in such a way that a hardness-increasing substance is added to the molecular structure of the plate portion 133, for example by a supply of carbon in a carbidizing process or nitrogen in a nitrating process.

Figure 4:
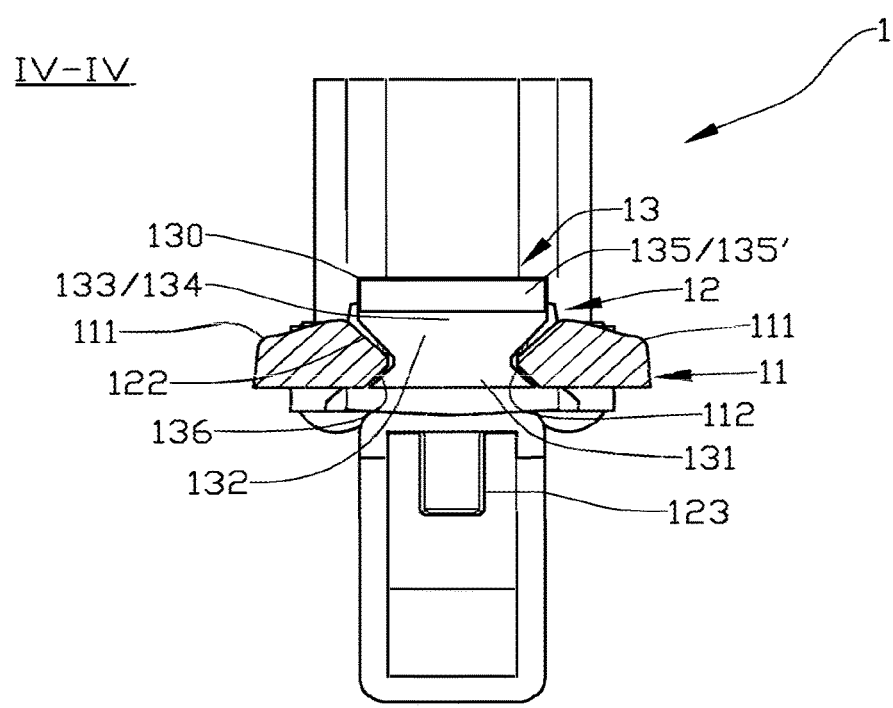
FIG. 4 shows a cross section IV-IV according to FIG. 3 through the wearing part.

A lower plate portion forms an attachment portion 131 with a sectional profile 136 complementary to the cross section of the quick-coupling element 112 of the wearing part 11, see FIG. 4 in particular.

When the wearing part 11 is being attached to the wearing-part attachment 12, the protection element 13 is inserted between the quick-coupling holders 111 of the wearing part 11, so that the sectional profile 136 of the attachment portion 131 engages with the quick-coupling elements 112 of the wearing part 11. Then the wearing part 11 is connected to the wearing-part attachment 12, the protection element 13 then coming to lie in front of the leading end face 121 of the wearing-part attachment 12. In an operative state, the flow of loose mass, for example earth, will push the protection element 13 against the wearing-part attachment 12, and the wearing portion 135 retards the wear on the protection element 13 so that it maintains its protective effect on the wearing-part attachment 12.

The effect has turned out to be surprisingly large, which testing of the protection element 13 provided with a wearing portion 135 only on part of the width of the protection element 13 has shown. While the portion of the top surface 124 that was protected by a plate element 135' showed insignificant wear, the portion of the top surface 124 that was not protected had worn down several millimetres in the course of a few days' use on a plough.

What is claimed:
1. An earth-working implement comprising:
  a wearing part configured as a leading edge of a working member having quick-coupling elements;
  a wearing-part attachment having a quick-coupling element that complements the quick-coupling elements of the wearing part; and
  a protection element comprising a flat plate having a wearing portion on a side of the flat plate facing a distal end of the earth-working implement,
  wherein a lower portion of the flat plate forms an attachment portion provided with notches, projecting portions, or a combination thereof configured to engage with the wearing part,
  wherein when the attachment portion is engaged with the wearing part, the protection element is configured to project above a plane coinciding with a top surface of at least a portion of the earth-working implement proximal to the protection element such that the portion of the earth-working implement proximal to the protection element is shielded from a flow of loose mass during use of the earth-working implement,
  wherein the wearing portion is arranged at an upper portion of the flat plate.
2. The earth-working implement according to claim 1, wherein the wearing portion is arranged at a distance from the attachment portion.
3. The earth-working implement according to claim 1, wherein the wearing portion comprises at least one of a plate element fixed to the flat plate by soldering or gluing, a coating applied to the flat plate in vapor form, or an upper plate portion with a hardness-increasing substance added to a molecular structure thereof.

4. The earth-working implement according to claim 1,
wherein the wearing portion is a plate element fixed to the flat plate by soldering or gluing, and
wherein the plate element is formed from carbide steel.

5. The earth-working implement according to claim 1,
wherein the wearing portion is a plate element fixed to the flat plate by soldering or gluing, and
wherein the plate element is formed from ceramic.

6. The earth-working implement according to claim 1,
wherein the wearing part is distal to the protection element, and
wherein the wearing-part attachment is proximal to the protection element.

7. The earth-working implement according to claim 1, wherein the earth-working implement comprises a plough or a cultivator.

8. The earth-working implement according to claim 1, wherein the attachment portion includes the notches, which comprise:
   a first notch extending into a first lateral side of the attachment portion; and
   a second notch extending into a second lateral side of the attachment portion,
   wherein the first notch is configured to receive a first portion of the quick-coupling elements and the second notch is configured to receive a second portion of the quick-coupling elements.

9. The earth-working implement according to claim 8, wherein each of the first and second notches is V-shaped.

10. The earth-working implement according to claim 9, wherein each of the first and second portions has a shape that complements the V-shape of the associated notch.

11. The earth-working implement according to claim 1, wherein the attachment portion includes the projecting portions, which comprise:
    a first projecting portion extending out from a first lateral side of the attachment portion; and
    a second projecting portion extending out from a second lateral side of the attachment portion,
    wherein the first projecting portion is configured to project into a first portion of the quick-coupling elements and the second projecting portion is configured to project into a second portion of the quick-coupling elements.

12. The earth-working implement according to claim 11, wherein each of the first and second portions has a shape that complements a shape of an associated projecting portion.

* * * * *